US006551362B2

(12) United States Patent
Guthrie et al.

(10) Patent No.: US 6,551,362 B2
(45) Date of Patent: Apr. 22, 2003

(54) COMPOSITION FOR DYEING MATERIAL OF SYNTHETIC AROMATIC POLYAMIDE FIBERS COMPRISING A CATIONIC DYE AND NOVEL DYE ASSISTANT

(75) Inventors: Darrin McBane Guthrie, Graham, NC (US); Harold Kenneth Greeson, Jr., Greensboro, NC (US); Malcolm S. Haith, Greensboro, NC (US)

(73) Assignee: BGB Stockhausen GmbH (DE)

( * ) Notice: Subject to any disclaimer, the term of this patent is extended or adjusted under 35 U.S.C. 154(b) by 125 days.

(21) Appl. No.: 09/776,348

(22) Filed: Feb. 2, 2001

(65) Prior Publication Data

US 2002/0144362 A1 Oct. 10, 2002

(51) Int. Cl.$^7$ .............................. D06P 3/24; D06P 1/651
(52) U.S. Cl. ..................... 8/607; 8/654; 8/657; 8/925
(58) Field of Search ........................... 8/607, 654–657, 8/925

(56) References Cited

U.S. PATENT DOCUMENTS

| 3,674,420 A | | 7/1972 | Sapers |
| 4,780,105 A | | 10/1988 | White et al. |
| 5,207,803 A | * | 5/1993 | Holsten et al. |
| 5,215,545 A | * | 6/1993 | Cates et al. |

OTHER PUBLICATIONS

Creanova Spezialchemie GmbH, "Product Information," (Apr. 1998).
Creanova Inc., "Material Safety Data Sheet," pp. 1–7, (Aug. 30, 2000).

* cited by examiner

*Primary Examiner*—Margaret Einsmann
(74) *Attorney, Agent, or Firm*—Smith Moore LLP

(57) ABSTRACT

A composition for dyeing material of synthetic aromatic polyamide fibers, said composition containing a mixture of (a) a cationic dye and (b) a cyclohexenone as a dye assistant. Preferably, 2-cyclohexen-1-one,3,5,5-trimethyl is the dye assistant.

16 Claims, No Drawings

COMPOSITION FOR DYEING MATERIAL OF SYNTHETIC AROMATIC POLYAMIDE FIBERS COMPRISING A CATIONIC DYE AND NOVEL DYE ASSISTANT

TECHNICAL FIELD

The present invention relates, in general, to a composition for dyeing material of synthetic aromatic polyamide fibers. More particularly, the present invention relates to such a dyeing composition comprising a cationic dye and a cyclohexenone, such as 2-cyclohexen-1-one,3,5,5-trimethyl.

BACKGROUND OF THE INVENTION

Aromatic polyamides have become important synthetic fibers. More specifically, fabrics made of such fibers have long been recognized for their excellent fire retardancy characteristics in that the fabrics have very high melting points and do not ignite at temperatures above their char points. Accordingly, such fabrics are the primary material used by fire fighters, race car drivers, astronauts, and others who may be subjected to fire or to high temperatures.

The aromatic polyamides are the resultant, for example, of a condensation product of an aromatic diamine with an aromatic diacid halide. Examples of such condensation products are sold under the NOMEX trade name, such as NOMEX 430, NOMEX 450, and NOMEX 455, by E.I. du Pont de Nemours & Co.

However, satisfactory dyeing of such aromatic polyamide materials has been difficult. As a result, a dye assistant has been used in conjunction with a cationic dye. For quite some time, the primary commercial dyeing method employed acetophenone as the dye assistant.

The use of acetophenone as a phenyl alkyl ketone dye assistant, as well as the use of cyclohexanone as a cycloalkyl ketone dye assistant, in the dyeing of fabrics such as NOMEX with a cationic dye, is disclosed in U.S. Pat. No. 3,674,420 issued in 1972 to Sapers, assignor to Arkansas Company, Inc. Sapers also discloses that the dye assistant is admixed with a surfactant, such as a block copolymer of propylene oxide and ethylene oxide (sold as PLURONIC F-68).

Nevertheless, acetophenone, which has been commercialized, is objectionable as a dye assistant not only because of its health effects on personnel (acetophenone is classified as hypnotic), but also because of its strong odor that permeates the dye house and imparts a residual odor to the dyed fabric. Moreover, acetophenone corrodes equipment and pollutes water.

An improved dye assistant is disclosed in U.S. Pat. No. 4,780,105 issued in 1988 to White, Ensley, and Dalton, assignors to Stockhausen, Inc. More specifically, the '105 patent describes a composition for dyeing material of synthetic aromatic polyamide fibers, where the composition includes (1) a cationic dye and (2) a dye assistant that is N-substituted phthalimide. The N-substituted phthalimide is admixed with an emulsifier, and preferably, the N-substituted phthalimide is a 2:1 mole ratio of N-butyl phthalimide and N-isopropyl phthalimide. Also preferably, the emulsifier is propylene oxide and ethylene oxide block polymer, and an anionic surfactant blend, and an anionic/cationic surfactant blend.

The disclosures of all of the mentioned patents are incorporated by reference.

Thus, a need still exists to find a dye assistant that is free from hypnotic effects (unlike acetophenone which is hypnotic), and yet is comparable to acetophenone.

SUMMARY AND OBJECTS OF THE INVENTION

Accordingly, the present invention provides a dyeing composition for dyeing material of synthetic aromatic polyamide materials, where the composition comprises (a) a cationic dye and (b) a cyclohexenone as a dye assistant. Preferably, the cyclohexenone dye assistant comprises a substituted cyclohexenone, more preferably, an alkyl-substituted cyclohexenone, even more preferably, a trialkyl-substituted cyclohexenone, and most preferably, 2-cyclohexen-1-one,3,5,5-trimethyl. The dye assistant may further comprise 3-cyclohexen-1-one,3,5,5-trimethyl.

While it is not intended to be bound to any theory, it is believed that the dye assistant operates via a mechanism that swells the synthetic aromatic polyamide materials.

Hence, it is an object of the present invention to provide a dyeing composition that employs a dye assistant that exhibits a satisfactory color yield and/or a color transfer.

Also, it is another object of the present invention to provide a dyeing composition that is free from hypnotic effects.

Some of the objects of the invention having been stated, other objects will become evident as the description proceeds, when taken in connection with the laboratory examples described below.

DETAILED DESCRIPTION OF THE INVENTION

The dyeing composition of the present invention is useful for dyeing synthetic aromatic polyamide materials, such as those made from fibers such as those sold under the trade name NOMEX, for instance, NOMEX 430, NOMEX 450, and NOMEX 455. NOMEX is a manufactured fiber in which the fiber forming substance is a long chain synthetic polyaramide in which at least 85% of the amide linkages, namely —C(O)—NH—, are attached directly to 2 aromatic rings, for instance, phenyl rings.

Any cationic dye may be employed in the present invention.

Suitable cationic dyes are those mentioned in the above-noted patent to Sapers, such as Astrazon Olive Green BL and Astrazon Orange 3RL (also known, respectively, as Basic Green 6 and Basic Orange 27, and both formerly manufactured by Verona Dyestuffs) and those mentioned in the above-noted patent to White, Ensley, and Dalton, such as Basic Yellow 21, Basic Blue 41, and Basic Red 18 (further identified in the color index, third edition, published by the Society of Dyers and Colourists, Dean House, Piccadilly Bradford, Yorkshire, England). Also useful as cationic dyes are Red GL, Yellow 5GL, Blue X-3GL-300, and Red FB, sold under the trade name BASACRYL by BASF Corporation.

In order to improve the leveling of the dye upon the polyamide material, a dispersing agent selected from surfactants and/or emulsifiers may be employed, including those mentioned in the above-noted patent to Sapers and patent to White, Ensley, and Dalton.

For instance, the patent to Sapers mentions that the surfactant used can be either a cationic surfactant, a blend of a nonionic surfactant plus an anionic surfactant, or a blend of a nonionic surfactant plus a cationic surfactant. An example of a cationic surfactant that can be employed is a coconut trimethyl ammonium chloride. An example of an anionic surfactant that can be employed is a nonyl phenoxy ethanoxy ammonium sulfate. Examples of nonionic surfactants that can be employed are a nonyl phenol reacted with 30 mols of ethylene oxide and PLURONIC F-68 which is a block copolymer of polypropylene oxide and ethylene oxide.

Also, as mentioned in the patent to White, Ensley, and Dalton, the emulsifier may be a block polymer of propylene oxide and ethylene oxide. As also mentioned the surfactant may be an anionic surfactant, such as a blend of a diethyl sulfate quaternary of a fatty tertiary amine, ethoxylated nonyl phenol together with a dodecylbenzene sulfonic acid amine salt, and the surfactant may be an anionic/cationic blend of a dodecylbenzene sulfonic acid amine salt and a low cloud point ethoxylated nonyl phenol.

Furthermore, a very suitable emulsifier useful in the present invention is available under the trade name WITCOMUL 1305 from Witco Chemical. WITCOMUL 1305 is a modified ethoxylated fatty acid.

The dye assistant useful in the present invention comprises a cyclohexenone.

Preferably, the dye assistant comprises a substituted cyclohexenone, more preferably, an alkyl-substituted cyclohexenone, even more preferably, a trialkyl-substituted cyclohexenone, and most preferably, 2-cyclohexen-1-one,3,5,5-trimethyl. The last is available commercially from Creanova, Inc. as ISOPHORONE, which is a blend of two isomers, namely 98 weight % of 2-cyclohexen-1-one,3,5,5-trimethyl as the major isomer and 2 weight % of 3-cyclohexen-1-one,3,5,5-trimethyl as the minor isomer.

According to product information provided by Creanova, Inc., ISOPHORONE has the following properties in accordance with the Table below.

Table of ISOPHORONE Properties

| Property | Value | Unit | Test Method |
| --- | --- | --- | --- |
| Appearance | clear | | visual |
| Colour (APHA) | ≦50 | mg Pt/l | DIN ISO 6271 |
| Purity (isomer mixture) | ≧98.0 | % by weight | gas chromatographic |
| Water content | ≦0.1 | % by weight | ASTM D 760 |
| Acid content (calculated as acetic acid) | ≦0.01 | % by weight | ASTM D 1613 |
| Molecular weight ($C_9H_{14}O$) | 138.21 | g/mol | |
| Solidification point | approx. −8 | ° C. | DIN ISO 3016 |
| Viscosity @ 20° C. | approx. 2.6 | mPa s | |
| Solubility parameter @ 25° C. | approx. 17.9 | $(J/cm^3)^{1/2}$ | |
| Heat of evaporation @ b.p. | approx. 42.4 | kJ/mol | |
| Vapour pressure @ 20° C. | 0.4 | hPa | |
| Evaporation number (diethyl ether = 1) | approx. 330 | | |
| Flash point | approx. 85 | ° C. | DIN 51758 |
| Refractive index @ 20° C. | approx. 1.477 | | DIN 51423 |
| Relative density @ 20° C. | approx. 0.918–0.923 | g/ml | DIN 51757 |
| Boiling range @ 10.13 hPa | 210–216 | ° C. | ASTM D 1078 |

Suitably, the proportion of dye assistant to fabric ranges from about 2 to about 50 weight %. Additionally, a small amount, such as about 1 to about 2 weight %, of a salt, such as sodium nitrate or sodium chloride is recommended in the dye bath. Also, the pH of the dye bath is adjusted with acid to a range from about 2.5 to about 4.0, more preferably from about 2.6 to about 3.5, with a pH of about 3.0 being preferred. Suitable acids for the pH adjustment are formic acid, acetic acid, and citric acid.

The dye bath is heated, as is typical in the dyeing process, and the temperature may be in a range from about 270° Fahrenheit (about 132° Celsius) to about 250° Fahrenheit (about 121° Celsius). Also, as is typical during the dyeing process, after 1 or 2 hours at this high temperature, the temperature of the dye bath may be lowered to a temperature in a range from about 190° Fahrenheit (about 88° Celsius) to about 140° Fahrenheit (about 60° Celsius). As is well known, the dye bath may be pressurized, and the time and temperature varied, depending on the desired intensity of color.

The following examples are intended to illustrate further the invention, and the invention is not to be limited by these examples. Each % in the following examples is a weight %, as on the weight of the fabric (OWF).

LABORATORY EXAMPLES

Example I

A stock dye mixture was made of three cationic dyes, namely 1.8% Red GL, 1.8% Yellow 5GL, and 0.6% Blue X-3GL (300%). Also, 4 aqueous dye baths were prepared, each containing, respectively, a composition of the stock dye mixture together with a dye assistant, where the pH of the composition was adjusted to 3.0 with acetic acid, as follows:

Bath 1 (comparison).
   30% acetophenone
   15% sodium nitrate
   5 ml of stock dye mixture
   acetic acid to adjust pH to 3.0

Bath 2 (the invention).
   30% ISOPHORONE
   15% sodium nitrate
   5 ml of stock dye mixture
   acetic acid to adjust pH to 3.0

Bath 3 (the invention).
  20% ISOPHORONE
  15% sodium nitrate
  5 ml of stock dye mixture
  acetic acid to adjust pH to 3.0
Bath 4 (the invention).
  10% ISOPHORONE
  15% sodium nitrate
  5 ml of stock dye mixture
  acetic acid to adjust pH to 3.0

For each of the 4 dye baths, a sample of NOMEX 455 fabric was dyed at about 265° Fahrenheit (about 129° Celsius) for about 1 hour.

The results were that the composition with ISOPHORONE as the dye assistant yielded equal color on NOMEX 455 as compared to the composition with acetophenone as the dye assistant.

Example II

The dyeing procedure of Example I was repeated for 6 additional aqueous dye baths prepared from compositions of dye assistant and stock dye mixture for dyeing NOMEX 455 fabric for about 1 hour at about 265° Fahrenheit (about 129° Celsius).

The following 6 dye baths prepared from compositions of dye assistant and stock dye mixture were employed:

Bath 1 (comparison).
  30% acetophenone
  15% sodium nitrate
  5 ml of stock dye mixture
  acetic acid to adjust pH to 3.0
Bath 2 (comparison).
  20% acetophenone
  15% sodium nitrate
  5 ml of stock dye mixture
  acetic acid to adjust pH to 3.0
Bath 3 (comparison).
  10% acetophenone
  15% sodium nitrate
  5 ml of stock dye mixture
  acetic acid to adjust pH to 3.0
Bath 4 (the invention).
  30% ISOPHORONE
  15% sodium nitrate
  5 ml of stock dye mixture
  acetic acid to adjust pH to 3.0
Bath 5 (the invention).
  20% ISOPHORONE
  15% sodium nitrate
  5 ml of stock dye mixture
  acetic acid to adjust pH to 3.0
Bath 6 (the invention).
  10% ISOPHORONE
  15% sodium nitrate
  5 ml of stock dye mixture
  acetic acid to adjust pH to 3.0

Compositions with ISOPHORONE as the dye assistant yielded comparably on NOMEX 455 as compared to compositions with acetophenone as the dye assistant.

Example III

For 2 additional dye baths prepared from compositions of dye assistant and dye mixture, the procedure of Example I was repeated, except that this time, color transfer was evaluated rather than dye yield as follows.

After dyeing, a color transfer test was performed in the following manner. A dyed fabric sample and an undyed fabric sample were heated together in a bath with the respective dyeing assistant and sodium nitrate (15% OWF) with acetic acid at pH 3 to about 265° Fahrenheit (about 129° Celsius) for about 1 hour. The amount of color transfer from each dyed sample to its respective undyed sample was evaluated.

The following 2 dye bath compositions were evaluated for color transfer:

Bath 1 (comparison).
  30% acetophenone
  15% sodium nitrate
  5 ml of stock dye mixture
  acetic acid to adjust pH to 3.0
Bath 2 (the invention).
  30% ISOPHORONE
  15% sodium nitrate
  5 ml of stock dye mixture
  acetic acid to adjust pH to 3.0

The results were that the composition with ISOPHORONE as the dye assistant was comparable to the composition with acetophenone as the dye assistant with respect to color transfer.

Example IV

The procedure of Example I was repeated for Bath 1 (comparison with acetophenone), and for Bath 2 (the invention with ISOPHORONE), except that this time ISOPHORONE was emulsified with 18.9% of WITCOMUL 1305 prior to admixing with the stock dye mixture to form a dye bath prepared from a composition of dye assistant, emulsifier, and stock dye mixture.

The results were that compositions with emulsified ISOPHORONE as the dye assistant yielded on NOMEX 455 comparably to compositions with acetophenone as the dye assistant.

It will be understood that various details of the invention may be changed without departing from the scope of the invention. Furthermore, the foregoing description is for the purpose of illustration only, and not for the purpose of limitation—the invention being defined by the claims.

What is claimed is:

1. A composition for dyeing material of synthetic aromatic polyamide materials, said composition comprising (a) a cationic dye and (b) a cyclohexenone as a dye assistant.

2. The composition of claim 1, wherein the dye assistant comprises a substituted cyclohexenone.

3. The composition of claim 2, wherein the dye assistant comprises an alkyl-substituted cyclohexenone.

4. The composition of claim 3, wherein the dye assistant comprises a trialkyl-substituted cyclohexenone.

5. The composition of claim 4, wherein the dye assistant comprises 2-cyclohexen-1-one,3,5,5-trimethyl.

6. The composition of claim 5, wherein the dye assistant further comprises 3-cyclohexen-1-one,3,5,5-trimethyl.

7. The composition of claim 6, wherein the dye assistant comprises about 98 weight % 2-cyclohexen-1-one,3,5,5-trimethyl and about 2 weight % 3-cyclohexen-1-one,3,5,5-trimethyl.

8. The composition of claim 5, further comprising a minor amount of a sodium salt.

9. The composition of claim 8, wherein the sodium salt is selected from the group consisting of sodium chloride, sodium nitrate, and combinations thereof.

10. The composition of claim 5, wherein the composition is pH adjusted with acid to a pH ranging from about 2.5 to about 4.0.

11. The composition of claim 10, where the acid is selected from the group consisting of acetic acid, citric acid, formic acid, and combinations thereof.

12. The composition of claim 5, wherein the cationic dye is selected from the group consisting of Basic Yellow 21, Basic Red 18, Basic Blue 41, Basic Orange 27, Basic Green 6, and combination thereof.

13. The composition of claim 5, further comprising a dispersing agent selected from the group consisting of an emulsifier, a surfactant, and combinations thereof.

14. The composition of claim 13, wherein the surfactant is selected from the group consisting of an anionic surfactant, a cationic surfactant, a nonionic surfactant, and combinations thereof.

15. The composition of claim 14, wherein the surfactant is selected from the group consisting of a nonyl phenoxy ethanoxy ammonium sulfate, a nonyl phenol reacted with 30 mols of ethylene oxide and a block copolymer of polypropylene oxide and ethylene oxide, a blend of a diethyl sulfate quaternary of a fatty tertiary amine, ethoxylated nonyl phenol together with a dodecylbenzene sulfonic acid amine salt, and a blend of dodecylbenzene sulfonic acid amine salt and a low cloud point ethoxylated nonyl phenol.

16. The composition of claim 13, wherein the emulsifier is selected from the group consisting of a modified ethoxylated fatty acid and a block copolymer of propylene oxide and ethylene oxide.

* * * * *